(12) United States Patent
Yamakado

(10) Patent No.: US 9,030,695 B2
(45) Date of Patent: May 12, 2015

(54) PRINTING SYSTEM, PRINTING DEVICE, SERVER, AND PRINTING METHOD FOR SETTING EXPIRATION INFORMATION FOR EMAIL ADDRESS OF PRINTING DEVICE

(71) Applicant: Seiko Epson Corporation, Tokyo (JP)

(72) Inventor: Hitoshi Yamakado, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/903,556

(22) Filed: May 28, 2013

(65) Prior Publication Data

US 2013/0342864 A1 Dec. 26, 2013

(30) Foreign Application Priority Data

Jun. 22, 2012 (JP) ................................. 2012-140547

(51) Int. Cl.
*G06F 3/12* (2006.01)
*H04N 1/00* (2006.01)
(52) U.S. Cl.
CPC ............ *G06F 3/1293* (2013.01); *G06F 3/1222* (2013.01); *G06F 3/1228* (2013.01); *G06F 3/1238* (2013.01); *G06F 3/126* (2013.01); *G06F 3/1285* (2013.01); *G06F 3/1204* (2013.01); *G06F 3/1239* (2013.01); *H04N 1/00095* (2013.01); *H04N 1/00108* (2013.01); *H04N 1/00127* (2013.01); *H04N 1/00137* (2013.01); *H04N 1/0014* (2013.01)
(58) Field of Classification Search
CPC . G06F 3/1205; G06F 3/1238; H04N 1/00164; H04N 1/00244; H04N 1/4413
See application file for complete search history.

(56) References Cited

U.S. PATENT DOCUMENTS

| 6,718,339 | B2 * | 4/2004 | Eden ..................................... 1/1 |
| 7,375,835 | B1 * | 5/2008 | Hull et al. ..................... 358/1.15 |
| 7,536,438 | B2 * | 5/2009 | Suzuki et al. ................. 709/206 |
| 8,027,049 | B2 * | 9/2011 | Kinoshita et al. ............ 358/1.15 |
| 2008/0068646 | A1 | 3/2008 | Kobayashi |
| 2012/0092723 | A1 * | 4/2012 | Jaudon et al. ................ 358/1.15 |
| 2013/0222843 | A1 * | 8/2013 | Ganesan et al. ............. 358/1.15 |

FOREIGN PATENT DOCUMENTS

JP 2008-071257 A 3/2008

OTHER PUBLICATIONS

The extended European Search Report for European Application No. 13168733.7 mailed Jun. 23, 2014.

* cited by examiner

*Primary Examiner* — Benny Q Tieu
*Assistant Examiner* — Sunil Chacko
(74) *Attorney, Agent, or Firm* — Global IP Counselors, LLP

(57) ABSTRACT

The advantage of the invention is to prevent malicious use of a leaked e-mail address. A printing system has a printer, and a server device which causes the printer to conduct printing of print target data included in an e-mail when receiving the e-mail that designates the printer as a printing place. The printing system has an expiration date setting section that sets an expiration date in an e-mail address that uses the printer as the printing place, a mail address registering section that registers the generated e-mail address and the set expiration date by being associated with each other, and an expiration date managing section that manages the registered expiration date and disables the e-mail address whose expiration date has expired.

8 Claims, 3 Drawing Sheets

PRINTING SYSTEM, PRINTING DEVICE, SERVER, AND PRINTING METHOD FOR SETTING EXPIRATION INFORMATION FOR EMAIL ADDRESS OF PRINTING DEVICE

CROSS-REFERENCE TO RELATED APPLICATIONS

This application claims priority to Japanese Patent Application No. 2012-140547 filed on Jun. 22, 2012. The entire disclosure of Japanese Patent Application No. 2012-140547 is hereby incorporated herein by reference.

BACKGROUND

1. Technical Field

The present invention relates to a printing system, a printing device, a server, and a printing method.

2. Background Technology

A cloud computing system has been known, which has functions of receiving an e-mail and printing the text or the attached file of the received e-mail (for example, Patent Document 1). This cloud computing system (hereinafter, referred to as a printing system) has a server that generates print data corresponding to a specified printer linked with an e-mail address based on the text of the e-mail or the attached file attached to the e-mail in the case of receiving the specified e-mail, and a printer that acquires the print data from the server and conducts printing. Accordingly, a user of the printing system can conduct printing by using the printer even if a printer driver is not installed for each client such as a personal computer or a smartphone.

Japanese Laid-open Patent Publication No. 2008-71257 (Patent Document 1) is an example of the related art.

SUMMARY

Problems to be Solved by the Invention

However, the e-mail address linked with the printer is determined at the time of default setting, and the same e-mail address will be continuously used after that. Therefore, the user of the printer will feel psychological resistance when the user discloses the e-mail address to a third party and allows the third party to use the printing system. This sometimes hinders the wide use of the printing system that is excellent in the convenience by using the e-mail address.

Means Used to Solve the Above-Mentioned Problems

The invention has been made to address the above-described circumstances at least partly, and can be implemented as the following aspect or application example.

APPLICATION EXAMPLE 1

A printing system of the invention causes a printing device designated as a printing place to conduct printing of print target data included in an e-mail that designates the printing place, and has a setting means that sets an expiration date in an e-mail address that uses the printing device as the printing place, a registering means that registers the e-mail address and the expiration date by being associated with each other, and a managing means that manages the expiration date registered in the registering means and disables the e-mail address whose expiration date has expired.

With this configuration, since an expiration date is set with respect to an e-mail address, even if a user discloses the e-mail address to a third party, the e-mail address will not be used on a permanent basis. Therefore, the psychological barrier that a user feels about disclosure of the e-mail address to a third party such as a friend of a printer owner is lowered, and a user can easily disclose the e-mail address to a third party. Consequently, the printing system using an e-mail address can be used more widely, and the printing system that is more excellent in the convenience can be achieved.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, an embodiment of the invention will be explained with reference to the drawings.

Embodiment

Figure 1:
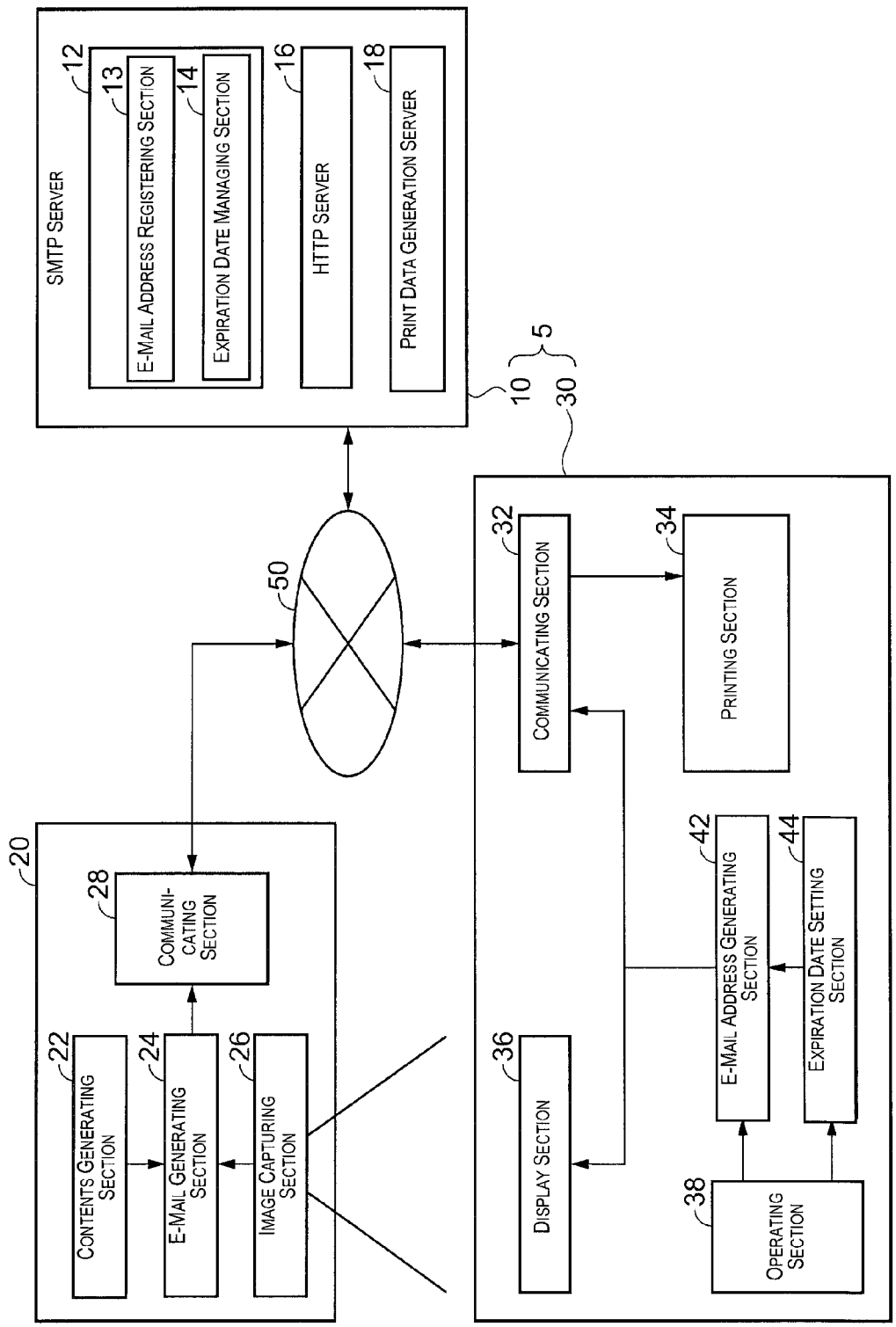
FIG. 1 is a block diagram that shows a configuration of a printing system according to an embodiment of the invention.

FIG. 1 is a block diagram that shows a configuration of a printing system 5 as an embodiment of the invention. The printing system 5 has a printer 30 that is connected in a state of being able to communicate through a network 50 such as the Internet, and a server device 10. In the present embodiment, the single printer 30 is used as the printing device that is connected to the network 50. However, a plurality of various printers that can communicate with the server device 10 can be connected to the network 50. In the printing system 5, in a case where a user operates an information processing device 20 that can be connected to the network 50 so as to generate contents, and an e-mail including the generated contents is sent to an e-mail address (mail address) having an expiration date information through the network 50, the server device 10 confirms the validity of the mail address, and when it is valid, an image of the contents is printed by the printer 30 that corresponds to the mail address.

The server device 10 has an SMTP server 12, an HTTP server 16, and a print data generation server 18. The present embodiment is based on a configuration in which these plural servers are consolidated to the single server device 10. However, other embodiments are possible, including an embodiment in which each server exists alone or an embodiment in which the function of each server is provided as cloud service. The SMTP server 12 receives an e-mail sent to a registered e-mail address. The HTTP server 16 provides service in response to a request (HTTP request) sent from a client such as the printer 30. The print data generation server 18 generates print data for printing the attached file attached to the e-mail or the text of the e-mail received by the SMTP server 12 in the printer 30 that corresponds to the mail address based on instructions of the SMTP server 12. The print data generated in the print data generation server 18 is transmitted to the printer 30 that corresponds to the mail address.

In the present embodiment, the SMTP server 12 has a mail address registering section 13 and an expiration date managing section 14. The mail address registering section (registering means) 13 receives a mail address generated by a mail address generating section 42, described below, from the printer 30, and registers the received mail address in a database for management. In the present embodiment, when the mail address is transmitted from the printer 30, expiration date information of the mail address and a printer ID that uniquely corresponds to a model name of the printing printer 30 are also transmitted. The mail address registering section 13 registers the printer ID, the mail address, and the expiration date information by being associated with each other. Here, the expiration date information includes time data that shows the expiration date to be judged as a valid mail address, and flag information that shows it is valid until printing is conducted once without determining the expiration date.

The expiration date managing section (managing means) 14 acquires and manages the mail address that shows the destination of the e-mail received by the SMTP server 12, and judges whether the acquired e-mail address is valid or not by referring to the expiration date information registered in the database of the mail address registering section 13. As a result of the judgment, if the mail address is valid, or the flag information shows it is valid until printing is conducted once, the expiration date managing section 14 instructs the print data generation server 18 to generate print data, so that the attached file attached to the e-mail is printed in the printer 30 that corresponds to the mail address. In a case where printing is conducted with the mail address that is valid until printing is conducted once, or the expiration date of the mail address expires, the mail address registering section 13 invalidates that mail address.

Also, as a result of the judgment, if the mail address is invalid because the expiration date of the mail address has expired, or the mail address is invalidated because printing has already been conducted once, the expiration date managing section 14 will not instruct the print data generation server 18 to generate print data. In such a case, the e-mail can be sent back to the information processing device 20, and a message can be issued to the e-mail sent from the information processing device 20 to notify that printing cannot be conducted. Further, the invalid mail address can be deleted from the database. The printer 30 has a communicating section 32, a printing section 34, a display section 36, an operating section 38, the mail address generating section 42, and an expiration date setting section 44. The communicating section 32 communicates with the server device 10 through the network 50 in accordance with HTTP. The printing section 34 prints an image, shown by the print data transmitted from the print data generation server 18, onto a medium such as printing paper. Incidentally, as the printing method, an ink-jet method, a laser method, a thermal transfer method, or the like can be used. The display section 36 displays information such as print settings of the printer 30.

The mail address generating section (generating means) 42 generates a mail address for sending an attached file that is a print target as an attachment to an e-mail so as to print in the printer 30. The expiration date setting section (setting means) 44 sets an expiration date with respect to the mail address generated in the mail address generating section 42. In the present embodiment, when a user determines the local part of the mail address by operating the operating section 38, it can be possible to determine by inputting an optional character string, or it can be possible to determine a character string extracted by the mail address generating section 42 at random as the local part. Also, when the user sets the expiration date by inputting time information with respect to the determined mail address, the previously set expiration date can be used as a default set value. Incidentally, when the expiration date is set, settings for making the mail address valid until printing is conducted once are displayed, so that a user can select. The mail address determined as described above and printer ID information that can identify the printer 30 are converted into a two-dimensional bar code and displayed on the display section 36. In addition to the mail address and the printer ID information, the information on the expiration date is transmitted from the communicating section 32 to the server device 10 through the network 50.

The information processing device 20 has a contents generating section 22, an e-mail generating section 24, an image capturing section 26, and a communicating section 28. The contents generating section 22 generates contents including a document, an image, and the like by operation of a user. The image capturing section 26 captures an image by operation of a user to the two-dimensional bar code displayed on the printer 30, and sends the captured image to the e-mail generating section 24. The e-mail generating section 24 analyzes an image of the two-dimensional bar code sent from the image capturing section 26, and restores the mail address and the printer ID information so as to be stored in a predetermined memory which is not shown in the drawing. Incidentally, a plurality of combinations of the mail address and the printer ID information are stored in the memory in advance. Here, in a case where a user selects the printer 30 for printing from the plurality of printer IDs stored in the memory, and instructs to print the contents generated in the contents generating section 22, the e-mail generating section 24 generates an e-mail to which data of the contents is attached as an attached file, and sends the e-mail from the communicating section 28 to the mail address that corresponds to the selected printer 30. However, it is not limited to the attached file, and an embodiment in which the data of the contents is decomposed in the text of the e-mail is possible.

Figure 2:
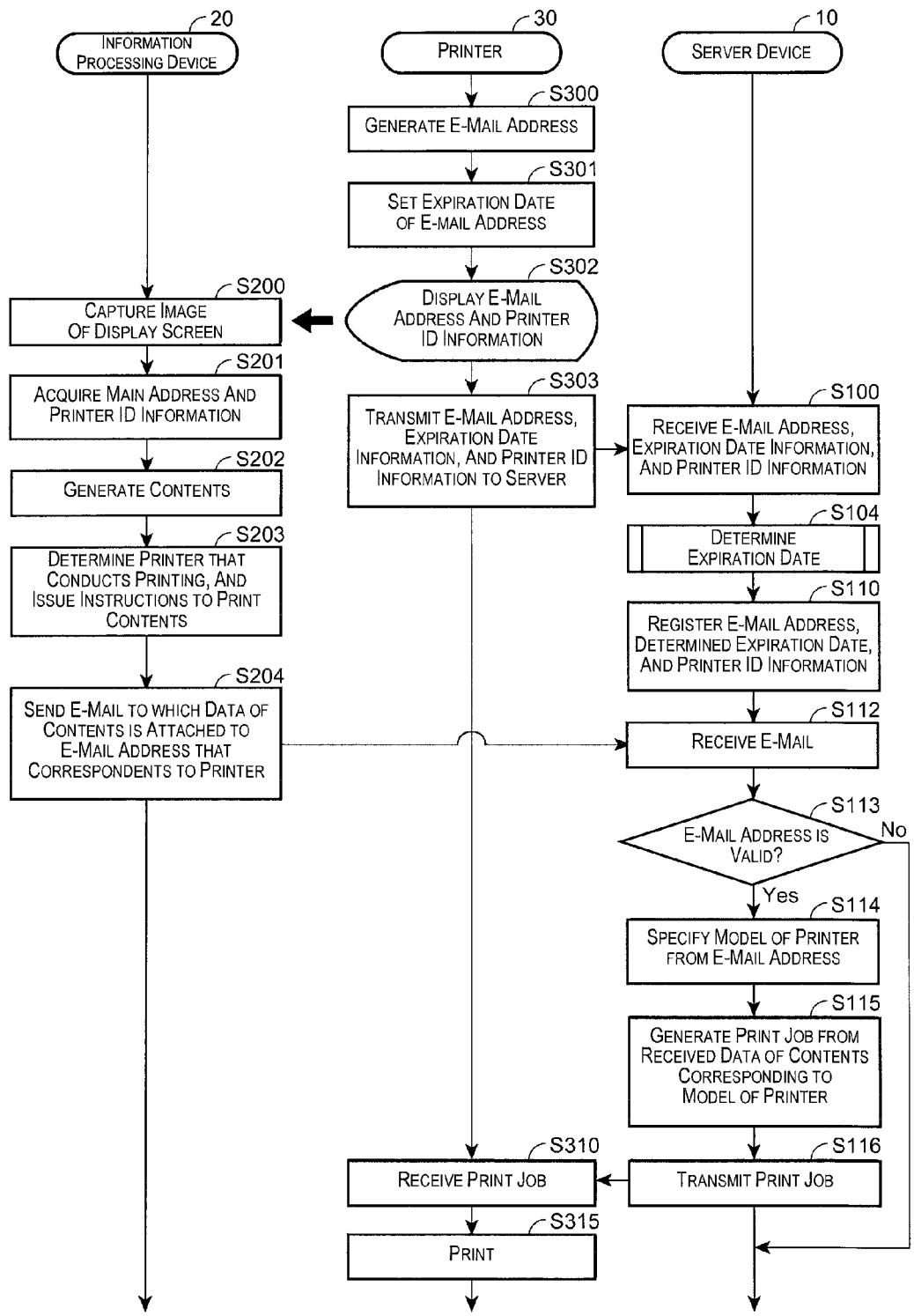
FIG. 2 is a flow chart that shows a print process.

In the present embodiment, the mail address and the printer ID information are converted into a two-dimensional bar code, and transmitted from the printer 30 to the information processing device 20 as an image. However, the invention is not limited to this. For example, another embodiment is possible, in which information is transmitted from the printer 30 to the information processing device 20 by wireless communication based on NFC (Near Field Communication), Bluetooth (registered trademark), Wi-Fi (registered trademark), and the like. Also, the mail address and the printer ID information can be displayed on the display section 36 in text form, and a user can enter characters by typing at a keyboard or the like of the information processing device 20. In the present embodiment, a cell phone, a portable information terminal, a notebook personal computer, and a desktop personal computer can be used as the information processing device 20. FIG. 2 is a flow chart that shows a print process in the printing system 5. First, the printer 30 generates a mail address that corresponds to the printer 30 itself by operation of a user (step S300). Subsequently, the printer 30 sets an expiration date of the generated mail address (step S301).

Next, the printer 30 converts the mail address and the printer ID information of itself into a two-dimensional bar code, and displays (step S302). Subsequently, the printer 30 transmits the mail address, the expiration date information, and the printer ID information to the server device 10 (step S303). On the other hand, the information processing device 20 captures an image of the two-dimensional bar code displayed on the printer 30 in step S302 by operation of a user (step S200), and acquires the mail address and the printer ID information from the two-dimensional bar code (step S201). Subsequently, the information processing device 20 generates contents based on operation of a user (step S202).

Figure 3:
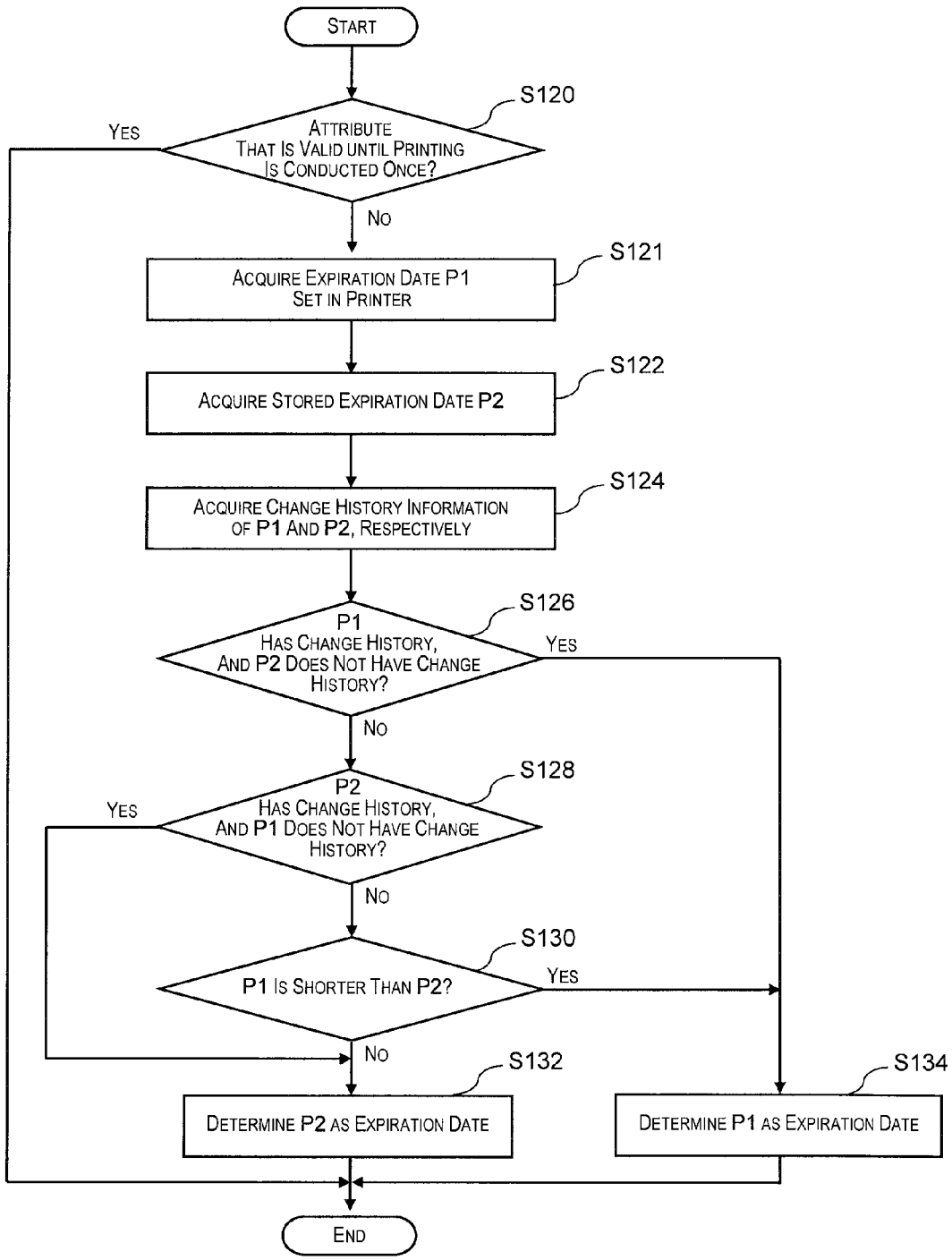
FIG. 3 is a flow chart that shows a process of determining an expiration date.

Next, a user determines the printer 30 that conducts printing, and issues instructions to print the generated contents (step S203). As a result, the information processing device 20 generates an e-mail to which data of the contents to be printed is attached as the attached file, and sends the generated e-mail to the mail address that corresponds to the printer 30 (step S204). On the other hand, the server device 10 receives the mail address, the expiration date information, and the printer ID information transmitted from the printer 30 in step S303 (step S100). Next, the server device 10 determines the expiration date of the mail address by referring to the received expiration date information (step S104). Here, FIG. 3 is a flow chart that shows a process of determining the expiration date in step S104.

When this process is started, the server device 10 judges whether or not it is attribute that is valid until printing is conducted once from the expiration date information (step S120). In a case where it is attribute that is valid until printing is conducted once (Yes in step S120), the process is finished without determining the expiration date. On the other hand, in a case where it is not attribute that is valid until printing is conducted once (No in step S120), the server device 10 acquires an expiration date P1 set in the printer 30 from the expiration date information (step S121). Next, the server device 10 acquires an expiration date P2 of the printer 30 from the stored expiration date information (step S122).

Next, the server device 10 acquires change history information of the two expiration date P1 and expiration date P2, respectively (step S124). Next, the server device 10 focuses the change histories and the time lengths of the two expiration date P1 and expiration date P2 (step S126, step S128, and step S130). In a case where the expiration date P1 has a change history and the expiration date P2 does not have a change history (Yes in step S126), the process moves on to step S134. In a case where the expiration date P2 has a change history and the expiration date P1 does not have a change history (Yes in step S128), the process moves on to step S132. In a case where both of step S126 and step S128 are No (No in step S126 and step S128), and the expiration date P1 is shorter than the expiration date P2 (Yes in step S130), the process moves on to step S134.

In step S134, the server device 10 determines P1 as the expiration date, and a series of processes are finished. On the other hand, in a case where the expiration date P1 is equal to or greater than the expiration date P2 (No in step S130), the process moves on to step S132. In step S132, the server device 10 determines P2 as the expiration date, and the process is finished. Back to FIG. 2, the server device 10 registers the printer ID information of the printer 30, the mail address, and the expiration date determined in step S104 by being associated with each other (step S110), and waits until it receives an e-mail sent from the information processing device 20. The server device 10 receives the e-mail sent from the information processing device 20 in step S204 (step S112). Here, the server device 10 acquires the expiration date of the mail address that is the address of the e-mail from the registered information, and judges whether the mail address is valid or not (step S113).

In a case where it is judged that the mail address is valid (Yes in step S113), the server device 10 specifies the model of the printer from the printer ID information associated with the mail address (step S114). Next, the server device 10 generates a print job from the data of the contents of the attached file by using a processing method corresponding to the model of the printer (step S115). Then, the generated print job is transmitted to the printer 30 (step S116), and a series of processes are finished. On the other hand, in a case where it is judged that the mail address is invalid (No in step S113), the process is finished without generating a print job.

The printer 30 receives the print job transmitted from the server device 10 (step 310), and conducts printing based on the received print job (step S315). Then, the process is finished. According to the above-described processes, data of the contents to be printed is attached to an e-mail, and sends the e-mail to the mail address that corresponds to the printer 30. With this, in the printing system 5 in which the contents are printed in the printer 30, an expiration date can be set to the mail address, the mail address can be easily changed, and execution of printing can be controlled by confirming that the mail address is valid. Consequently, spam mails or malicious printing instructions of a third party can be effectively eliminated. Further, since the mail address can be set to be valid for one printing, leakage of address information, misuse by impersonation, or the like can be prevented by setting a temporary mail address such as a disposable mail address. Furthermore, in a case where the mail address is invalid because the expiration date of the mail address has expired, the information processing device 20 is notified of information that printing cannot be conducted, and a user can easily know that the expiration date of the mail address has expired.

Although an embodiment of the invention was explained with reference to the drawings, the specific configuration is not limited to this embodiment, and the invention includes design changes or the like as long as it does not depart from the subject matter of the invention. For example, the mail address generating section 42 and the expiration date setting section 44 provided in the printer 30 according to the invention can be provided in the server device 10. Further, the invention is not limited to the mail address that is valid until printing is conducted once, and the mail address that is valid until printing is conducted predetermined times such as twice or more is also possible. Further, the expiration date managing section 14 is not limited to an embodiment in which the expiration date managing section 14 is provided in the server device 10, and an embodiment in which the expiration date managing section 14 is provided in the printer 30 is also possible. Further, a device for implementing the above-described technique includes various kinds of embodiments. There are cases in which it is achieved by a single device, and there are cases in which it is achieved by combining a plurality of devices.

What is claimed is:

1. A printing system, which causes a printing device designated as a printing place to conduct printing of print target data included in an e-mail that designates the printing place, the printing system comprising:
    a setting unit that sets an expiration information for an e-mail address designating the printing place as the printing device that conducts the printing of the print target data included in the e-mail;
    a registering unit that registers the e-mail address, an identification data of the printing device, and the expiration information by being associated with each other;
    a print data generation unit that generates the print target data according to the identification data; and
    a managing unit that manages the expiration information registered in the registering unit and disables the e-mail address whose expiration information has expired,
    the managing unit being configured to perform an instruction process to instruct the print data generation unit to generate the print target data according to the identification data to transfer the print target data to the printing device via a network and cause the printing device to print the print target data in a case where the expiration information of the e-mail address does not expire, the managing unit being configured not to perform the instruction process in a case where the expiration information expires.

2. The printing system according to claim 1, wherein the expiration information corresponds to a predetermined number of times at which the printing using the e-mail address is conducted, and the e-mail address is valid until a number of times of conducting the printing reaches the predetermined number.

3. The printing system according to claim 1, wherein the expiration information corresponds to time data that is input.

4. The printing system according to claim 1, further comprising a mail address generation section that generates the e-mail address,
the setting unit setting the expiration information for the e-mail address generated by the mail address generating section.

5. The printing system according to claim 4, wherein information of the e-mail address generated in the mail address generating unit is transmitted to an information processing device, and the information processing device sends the e-mail to the e-mail address as an address.

6. The printing system according to claim 5, wherein the managing unit notifies of the information processing device that printing is not conducted in the printing device in a case where the e-mail address as the address is invalid because of the expiration information.

7. A printing device configured to connect to a server and communicate the server, the server including a print data generation unit that generates a print target data included in an e-mail that designates a printing place according to an identification data of the printing device and causing the printing place to conduct printing of the print target data included in the e-mail when receiving the e-mail that designates the printing place, the printing device comprising:
a setting section that sets an expiration information for an e-mail address designating the printing device as the printing place that conducts the printing of the print target data included in the e-mail;
a registering section that registers the e-mail address, the identification data, and the expiration information by being associated with each other; and
a managing section that manages the expiration information registered in the registering section and disables the e-mail address whose expiration information has expired,
the managing unit being configured to perform an instruction process to instruct the print data generation unit to generate the print target data according to the identification data to transfer the print target data to the printing device via a network and cause the printing device to print the print target data in a case where the expiration information of the e-mail address does not expire, the managing unit being configured not to perform the instruction process in a case where the expiration information expires.

8. A server, which causes a printing device to conduct printing of print target data included in an e-mail when receiving the e-mail that designates the printing device configured to connect to and communicate the server as a printing place, the server comprising:
a setting section that sets an expiration information for an e-mail address designating the printing device as the printing place that conducts the printing of the print target data included in the e-mail;
a registering section that registers the e-mail address, an identification data of the printing device, and the expiration information by being associated with each other;
a print data generation unit that generates the print target data according to the identification data; and
a managing section that manages the expiration information registered in the registering section and disables the e-mail address whose expiration information has expired,
the managing unit being configured to perform an instruction process to instruct the print data generation unit to generate the print target data according to the identification data to transfer the print target data to the printing device via a network and cause the printing device to print the print target data in a case where the expiration information of the e-mail address does not expire, the managing unit being configured not to perform the instruction process in a case where the expiration information expires.

* * * * *